(12) United States Patent
Eyring et al.

(10) Patent No.: US 12,285,990 B2
(45) Date of Patent: Apr. 29, 2025

(54) BOGIE AXLE FOR A VEHICLE WITH A PREFERRED TRAVELLING DIRECTION, AND VEHICLE WITH AT LEAST ONE BOGIE AXLE OF THIS TYPE

(71) Applicant: NAF NEUNKIRCHENER ACHSENFABRIK AG, Neunkirchen (DE)

(72) Inventors: Alexander Eyring, Munich (DE); Stefan Maier, Stockdorf (DE); Bernhard Schnabel, Starnberg (DE)

(73) Assignee: NAF NEUNKIRCHENER ACHSENFABRIK AG, Neunkirchen (DE)

( * ) Notice: Subject to any disclaimer, the term of this patent is extended or adjusted under 35 U.S.C. 154(b) by 0 days.

(21) Appl. No.: 18/570,760

(22) PCT Filed: Jun. 15, 2021

(86) PCT No.: PCT/EP2021/066093
§ 371 (c)(1),
(2) Date: Dec. 15, 2023

(87) PCT Pub. No.: WO2022/262953
PCT Pub. Date: Dec. 22, 2022

(65) Prior Publication Data
US 2024/0227480 A1    Jul. 11, 2024

(51) Int. Cl.
B60G 5/02    (2006.01)
(52) U.S. Cl.
CPC .......... B60G 5/02 (2013.01); *B60G 2200/318* (2013.01); *B60G 2200/422* (2013.01);
(Continued)

(58) Field of Classification Search
CPC ...... B60G 2200/318; B60G 2206/0112; B60G 5/02; B60G 2200/422; B60G 2300/08; B60G 2400/61; B61F 5/00
See application file for complete search history.

(56) References Cited

U.S. PATENT DOCUMENTS

| 2,209,528 | A | * | 7/1940 | Larison | ..................... B60G 5/02 280/680 |
| 2,680,625 | A | * | 6/1954 | Richardson | ............... B60G 5/02 280/80.1 |

(Continued)

FOREIGN PATENT DOCUMENTS

| DE | 20217910 | U1 |   | 2/2003 |  |
| DE | 202018103334 | U1 | * | 8/2018 | ........... B60G 11/185 |
| EP | 0520389 | A2 | * | 12/1992 | ........... B60K 17/046 |
| FI | 20175421 | A |   | 11/2017 |  |
| FI | 129208 | B | * | 9/2021 | ............. B60K 17/36 |
| FR | 1377918 | A | * | 11/1964 | ............... B60G 5/02 |

(Continued)

OTHER PUBLICATIONS

Russian Application No. 2024100551, Search Report dated Sep. 16, 2024.

*Primary Examiner* — Paul N Dickson
*Assistant Examiner* — Matthew D Lee
(74) *Attorney, Agent, or Firm* — Tarolli, Sundheim, Covell & Tummino LLP (57) ABSTRACT

The invention relates to a bogie axle (10) for a vehicle (12) with a preferred travelling direction (V). The bogie axle (10) comprises at least one axle rocker (14) which has, as output, two hubs (16) which are arranged spaced apart for the arrangement of a front wheel (18) and a rear wheel (18), and which has an eccentric axle rocker mounting (20) which is arranged between the hubs (16) for pivotable mounting of the axle rocker (14) on an axle carrier, wherein the axle rocker mounting (20) has, as input, an input shaft (22) which, in order to drive the front wheel (18) and the rear wheel (18), is coupled thereto via at least one transmission (Continued)

(24). A geometry of the at least one axle rocker (14) corresponds to formula (I): in which e denotes an eccentricity of a rotational axis (D) of the axle rocker mounting (20) in the preferred travelling direction (V) starting from a centre axis (M) which is arranged between the hubs (16). The invention further relates to a vehicle (12) with a bogie axle (10) of this type.

$$0.05 \leq \frac{e}{R\left(1 - \frac{i_{BB}}{t}\right) + a} = \frac{FT}{FG} \leq 0.4 \qquad (I)$$

15 Claims, 6 Drawing Sheets

(52) U.S. Cl.
CPC .............................. *B60G 2204/419* (2013.01); *B60G 2206/0112* (2013.01); *B60G 2300/08* (2013.01); *B60G 2400/61* (2013.01)

(56) References Cited

U.S. PATENT DOCUMENTS

| | | | | |
|---|---|---|---|---|
| 3,547,461 | A | * 12/1970 | Sheridan | B60G 5/02 280/681 |
| 5,562,172 | A | * 10/1996 | Mick | B62D 49/0607 280/5.2 |
| 5,655,615 | A | * 8/1997 | Mick | B62D 49/0607 280/5.2 |
| 6,179,075 | B1 | * 1/2001 | Figura | B60G 5/02 180/24.04 |
| 11,691,470 | B2 | * 7/2023 | Stelman | B62D 63/02 280/5.28 |
| 2010/0102537 | A1 | * 4/2010 | Daniel | B60G 5/02 280/683 |
| 2023/0140923 | A1 | * 5/2023 | Medeiros | B60K 17/346 475/231 |
| 2023/0399065 | A1 | * 12/2023 | Nagasue | B62D 65/18 |

FOREIGN PATENT DOCUMENTS

RU    2278496 C2    6/2006
WO    2012/123630 A1    9/2012

* cited by examiner

BOGIE AXLE FOR A VEHICLE WITH A PREFERRED TRAVELLING DIRECTION, AND VEHICLE WITH AT LEAST ONE BOGIE AXLE OF THIS TYPE

The invention relates to a bogie axle for a vehicle with a preferred travelling direction as well as to a vehicle with at least one such bogie axle.

Bogie axles, which are also called twin axle aggregates, pendulum aggregates or tandem axles, are twin axles, which can be connected to a vehicle frame of a vehicle. A bogie axle generally includes at least one axle rocker also called tandem axle carrier, which comprises two hubs arranged spaced as an output for arrangement of a front wheel and a rear wheel, and which comprises an axle rocker mounting arranged between the hubs for mounting the axle rocker on a rigid axle carrier. The axle rocker mounting in turn comprises an input shaft as an input, which, for driving the front wheel and the rear wheel, is coupled to them via at least one transmission.

The advantage of this construction is in that tires attached to the hubs maintain ground contact even in case of considerable ground irregularities. Conventional tandem or bogie axles additionally offer the advantage of identical wheel loads at the front and rear at stop and exhibit an at least substantially identical travelling behavior in forward and rearward travel.

With increasing gear ratio in the axle rocker and the final outputs as well as increasing superelevation between input and output of the axle rocker, however, a rising effect increasingly arises with conventional bogie axles during the travel, which unloads the front wheel and generates more load on the rear wheel at the same time. This results in ununiform ground pressure, an increased load of the drive and of the tire as well as in traction problems in some travelling situations. In a vehicle with a preferred travelling direction, for example a forwarder, motor grader, combine harvester or a similar self-propelled harvesting or construction machine, which travel in one travelling direction (usually forward) considerably above 50%, for example 60%, 70%, 80%, 90% or more of their usual operating time and in an opposite travelling direction (usually rearward) only for turning and maneuvering, thus, the same rear part of the drive of the bogie axle as well as the rear tire is always more severely loaded. Previous attempts to compensate for such a rising effect, have in turn caused new disadvantages such as for example a considerable additional installation space requirement and an inferior efficiency by additional drive components. Moreover, the rising effect is also suppressed if it is desired, for example upon traversing an obstacle (rock, roots, trenches etc.).

It is the object of the present invention to provide a bogie axle for a vehicle with a preferred travelling direction, which allows improved travelling characteristics at least upon travel of the vehicle in the preferred travelling direction. A further object of the invention is in providing a vehicle with a preferred travelling direction, which has improved travelling characteristics at least in travelling in the preferred travelling direction and avoids the disadvantages of the conventional prior art.

According to the invention, the objects are solved by a bogie axle with the features of claim 1 as well as by a vehicle according to claim 7. Advantageous configurations with convenient developments of the invention are specified in the respective dependent claims, wherein advantageous configurations of the first inventive aspect are to be regarded as advantageous configurations of the second inventive aspect and vice versa.

A first aspect of the invention relates to a bogie axle for a vehicle with a preferred travelling direction, comprising at least one axle rocker, which comprises two hubs arranged spaced as an output for arranging a front wheel and a rear wheel, and which comprises an axle rocker mounting arranged between the hubs for pivotable mounting of the axle rocker on an axle carrier or vehicle frame, wherein the axle rocker mounting comprises an input shaft as an input, which, for driving the front wheel and the rear wheel, is coupled to them via at least one transmission. According to the invention, an improved travelling behavior of an associated vehicle with a preferred travelling direction is provided in that a geometry of the at least one axle rocker corresponds to formula I:

$$0.05 \leq \frac{e}{R\left(1 - \frac{i_{BB}}{t}\right) + a} = \frac{FT}{FG} \leq 0.4, \qquad (I)$$

in which there denote e: eccentricity of a rotational axis of the axle rocker mounting in the preferred travelling direction starting from a center axis arranged between the hubs, R: static tire radius of the wheels to be mounted, i: transmission gear ratio of the axle rocker as a ratio of an input rotational speed of the input to an output rotational speed of the output, a: superelevation of the rotational axis with respect to the center points of the hubs of the axle rocker, FT: sum of the tangential wheel loads FT of the bogie axle in the mounted state during the operation of the vehicle, and FG: sum of the radial front wheel loads $FR_v$ and of the radial rear wheel loads $FR_h$ of the bogie axle in the mounted state during the operation of the vehicle, and in which $i_{BB}$ is 1 if the bogie axle does not comprise a torque divider for homogenization of a moment of force ununiformly acting on the front wheel and the rear wheel, or in which $i_{BB}$ denotes a gear ratio of the torque divider if the bogie axle comprises the torque divider for homogenization of the moment of force ununiformly acting on the front wheel and the rear wheel. In other words, according to the invention, the bogie axle is eccentrically mounted, wherein the eccentricity e is adapted to the tire radius R, the superelevation of the rotational axis (D) with respect to the central points of the hubs of the axle rocker a as well as to the gear ratios of the transmissions between input and output of the axle rocker i and iBB such that the mentioned formula (I) applies. By the inventive eccentric displacement of the mounting of the axle rocker to the front or into preferred travelling direction of the vehicle, the static axle load is displaced towards the front wheel. Preferably, the bogie axle includes two axle rockers and accordingly four hubs in total for mounting four tires, wherein the two axle rockers are arranged on each side of the associated vehicle.

As it has been surprisingly found out, the parameters mentioned in formula (I) can be selected within the scope of the limit values 0.05 and 0.4 according to formula such that for respectively typical traction force-axle load ratios FT/FG of different vehicles with preferred travelling direction, a substantial or complete or at least nearly complete compensation for the rising effect results at least during forward travel or in typical working situations. Thus, the ratio FT/FG can for example be 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40, wherein corresponding intermediate values like 0.371, 0.372 and so on can of course also be provided, which are also to be regarded as disclosed.

Therein, the upper limit 0.4 defines a ratio FT/FG, which is usually reasonable especially for heavy applications, for example for forestry machines. In contrast, the lower limit 0.05 ensures that a comparatively small rising effect can also still be reliably compensated for in less heavy applications. According to requirement, a maximum traction force ratio or a medium or low traction force ratio can thus be responsible for the degree of the eccentricity of the bogie axle in typical working situations. In working machines with variable useful load such as for example harvesting machines, the axle load and thereby FG for example continuously increases with increasing loading. At the same time, however, the required traction force also increases thereby, such that a similar, approximately identical traction force ratio FT/FG appears even in such vehicles with given ground conditions over longer time intervals.

With the aid of the bogie axle according to the invention, numerous advantages arise for vehicles with a preferred travelling direction. The front wheel normally less loaded in the operation is first more severely loaded at stop. By the rising effect of the bogie axle according to the invention, however, the front wheel is then unloaded in the operation, whereby the wheel contact forces are homogenized at the front and rear. By suitable choice of the parameters mentioned in formula (I), the wheel contact forces can therefore be largely or even completely or at least nearly completely compensated for in the typical operating point of the associated vehicle. Upon traversing heavy obstacles, that is with high traction force requirements ("full power"), the front wheel is then advantageously even further unloaded and the axle load displaces to the rear wheel, such that a certain rising effect again results, which facilitates traversing the obstacle. However, the maximum load of the rear wheel is nevertheless lower in this case than in a conventional, symmetrically mounted bogie axle. The drive components at least of the rear wheel can thus be designed more lightweight and more inexpensively in the bogie axle according to the invention. The eccentric mounting of the bogie axle according to the invention additionally does not require an additional installation space and additional drive components and can therefore be approximately cost-neutrally designed. Moreover, already existing vehicles can also be retrofitted without problem and be equipped with the bogie axle according to the invention. By the optimized rising effect with high traction force, an increased lifetime of the bogie axle can additionally be realized. Within the scope of the present disclosure, the term "front" (v) generally denotes elements of the bogie axle in preferred travelling direction in the mounting state on the associated vehicle, while the term "rear" (h) inversely denotes elements of the bogie axle opposite to the preferred travelling direction. The term "tangential" relates to a vector, which extends parallel to a flat ground surface, on which the bogie axle with mounted (preferably identically dimensioned) tires is arranged. Accordingly, the term "radial" denotes a vector perpendicular to this flat ground surface. Furthermore, "a/one" are generally to be read as indefinite articles within the scope of this disclosure, thus always also as "at least one" without expressively opposite indication. Conversely, "a/one" can also be understood as "only one".

In an advantageous configuration of the invention, it is provided that the static tire radius R is selected smaller than in an equivalent associated vehicle with a two-wheeled rigid axle instead of the bogie axle. In other words, it is provided that tires are mounted on the hubs of the bogie axle, the radius R of which is smaller than the radius R' of those tires, which would normally be mounted on the associated vehicle, if it would not comprise the bogie axle according to the invention, but a conventional, two-wheeled rigid axle. Hereby, such two-wheeled rigid axles can be particularly simply replaced with the bogie axle according to the invention, such that existing vehicles can also be correspondingly simply retrofitted without additional reconstruction measures.

Further advantages arise in that the transmission gear ratio i is selected such that the tire radius R smaller compared to the rigid axle is at least 90%, preferably at least 98%, in particular 100% compensated for, and/or that the superelevation a of the rotational axis with respect to the central points of the hubs of the axle rocker is selected such that a height difference, which arises by the tire radii R smaller compared to the rigid axle, is at least 90%, preferably at least 98%, in particular 100% compensated for. Hereby, two-wheeled rigid axles can be particularly simply replaced with the bogie axle according to the invention with identical or at least substantially identical traction force and/or maximum speed.

In an advantageous configuration of the invention, it is provided that the input shaft comprises a stub shaft for connection of a vehicle-side drive shaft. This represents a constructively simple and flexible possibility of connecting an external drive shaft in separate construction and facilitates the exchangeability with the output of a conventional, two-wheeled drive axle in contrast to a continuous input shaft from the vehicle transmission into the axle rocker.

In an advantageous configuration of the invention, it is provided that a mounting is provided, by means of which the stub shaft is rotatably mounted on the axle rocker. Such an independent mounting of the input shaft also allows a "separate" construction, in which separate assemblies are attached in the vehicle frame and can be connected to the also separately attached wheel output or the axle rocker by means of an optionally open running shaft as it is for example usual in combine harvesters.

In an advantageous configuration of the invention, it is provided that the mounting is arranged centered in a ring of the axle rocker mounting stationary with respect to a vehicle frame of the vehicle, whereby an optimum alignment of the shafts can advantageously be ensured. In contrast, a conventional mounting in the tandem axle carrier is disadvantageous because the stub shaft for connecting a drive shaft coming from the differential would then be offset to the connection of the slewing ring on the vehicle frame due to tolerance. Thereby, flexible clutches, cardan shafts or other such components would be required for connecting the drive shaft, which can advantageously be omitted with the present configuration according to the invention.

Alternatively or additionally, it is provided that the mounting includes a flange, which comprises threads for attaching the axle rocker to the vehicle, in particular to the vehicle frame thereof. In that the flange is configured for this mounting such that it provides the threads for attaching to the vehicle frame at the same time, a design of the bogie axle according to the invention optimized in cost and installation space can be realized.

A second aspect of the invention relates to a vehicle with a preferred travelling direction, comprising at least one bogie axle according to the first inventive aspect.

Hereby, the vehicle according to the invention has improved travelling characteristics at least in travelling in the preferred travelling direction. Preferably, the bogie axle comprises at least two axle rockers, which are arranged on respective sides of the vehicle. Furthermore, it can be provided that the vehicle comprises exactly one bogie axle, which is preferably attached or pivotably fixed to a vehicle frame in a front half of the vehicle. Further features and the advantages thereof can be taken from the descriptions of the first inventive aspect, wherein advantageous configurations of the first inventive aspect are to be regarded as advantageous configurations of the second inventive aspect and vice versa.

In an advantageous configuration of the invention, it is provided that the vehicle comprises at least one bogie stopper, by means of which a relative movement, in particular a rotational movement, of the axle rocker with respect to the vehicle frame is limited. Such a bogie stopper together with an associated stop generally represents a constructively simple possibility of limiting the relative movement of the axle rocker with respect to the vehicle frame and thus of particularly reliably preventing a tire collision with the vehicle frame, a rollover of the axle rocker and the like. Optionally, the bogie stopper can be arranged stationarily with respect to the vehicle frame or stationarily with respect to the axle rocker and cooperate with a corresponding stop, which is correspondingly arranged on the axle rocker or on the vehicle frame.

Preferably, it is provided that the bogie stopper and/or the vehicle frame comprise at least one stop element, which is preferably detachably attached. Such a stop element represents a stop point on the vehicle frame and/or on the axle rocker, which can be easily exchanged and thus be simply replaced upon damage. Similarly, simple adaptations of the stop points and dimensions to different vehicle-axle rocker combinations are possible.

In an advantageous configuration of the invention, it is provided that it includes at least one actuator, by means of which an actuating force can be exerted on the axle rocker, to load and/or to unload the rear wheel and/or the front wheel. Hereby, a type of "bogie lift" can be realized. In that an actuator or multiple actuators (for example hydraulic cylinders), which is or are attached to the vehicle frame on the one hand and to the rear and/or front area of the axle rocker on the other hand, thus, the rear wheel can be pressed downwards or pulled upwards as needed to load the rear wheel and to unload the front wheel. Conversely, the front wheel can of course also be loaded and the rear wheel can be unloaded. The "bogie lift" can be advantageously employed in forward travelling to unload the front wheel and thus to support turning maneuvers (for example at the field end). Upon complete unloading of the front wheel, the turning circle is thereby also reduced, which is for example advantageous in maneuvering in narrow yards.

In an advantageous configuration of the invention, it is provided that the actuator can be manually actuated and/or is coupled to a first control device of the vehicle, wherein the first control device is formed to control and/or regulate the actuator depending on a travelling situation. Hereby, loading or unloading of the front or rear wheel can be performed depending on situation and optionally in controlled and/or regulated manner. Hereto, the control device can for example use position data, sensor data, camera data, user inputs or the like for controlling and/or regulating the at least one actuator. Thus, the "bogie lift" can for example be manually actuated, for example in turning, or also by means of the control device, for example in braking.

Preferably, it is provided that the bogie axle comprises the torque divider for homogenizing a moment of force ununiformly acting on the front wheel and the rear wheel, wherein the torque divider preferably includes a double planetary gearing. Such a torque divider can also be referred to as "balancing system" and advantageously be used for compensating for the weight displacement of the bogie axle according to the invention to the front wheel in braking. Similarly, the torque divider can be advantageously employed if the traction force ratio of the vehicle is particularly high in the operation, such that the computationally required eccentricity of the mounting would become too great for the practical application and would violate the limits specified in formula (I). In an advantageous design of the torque divider by means of a double planetary gearing at the input, the gear ratio of the axle rocker effective for the dynamic wheel load displacement reduces by the gear ratio of the planetary gearing and the condition for uniform wheel loads is then calculated as follows:

$$\frac{e}{R\left(1-\frac{i_{BB}}{i}\right)+a} = \frac{FT}{FG},$$

wherein $i_{BB}$ denotes the gear ratio of the torque divider (balancing system). Therein, $0.05 \leq FT/FG \leq 0.4$ has to apply according to formula (I) according to the invention.

Thus, a lower eccentricity e is then required for the same traction force ratio FT/FG to balance the wheel forces at the front and rear.

In a further advantageous configuration of the invention, it is provided that the torque divider is coupled to a second control device of the vehicle, wherein the second control device is formed to control and/or regulate the torque divider depending on a travelling situation. Hereby, the torque divider can also be "actively" controlled or regulated. Therein, the second control device can be formed independently of the first control device and optionally be coupled to it for data exchange. Alternatively, the second control device can be a part of the first control device.

Preferably, it is provided that the second control device controls and/or regulates the torque divider upon violation of a preset traction force ratio limit value, in particular upon accelerating and/or braking the vehicle, such that a wheel load displacement to the relatively unloaded front wheel or to the relatively unloaded rear wheel is effected. This too represents a constructively advantageous possibility of balancing the front and rear wheel forces of the bogie axle according to the invention as well as of improving the travelling characteristics of the vehicle.

In an advantageous configuration of the invention, it is provided that it is formed as an agricultural machine, in particular as a combine harvester, and/or as a forestry machine, in particular as a forwarder, or as a construction machine, in particular as a motor grader. Hereby, the advantages of the bogie axle according to the invention can be realized in various vehicle types, which are largely predominantly or nearly exclusively operated in a preferred travelling direction.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims. There shows:

Figure 1:
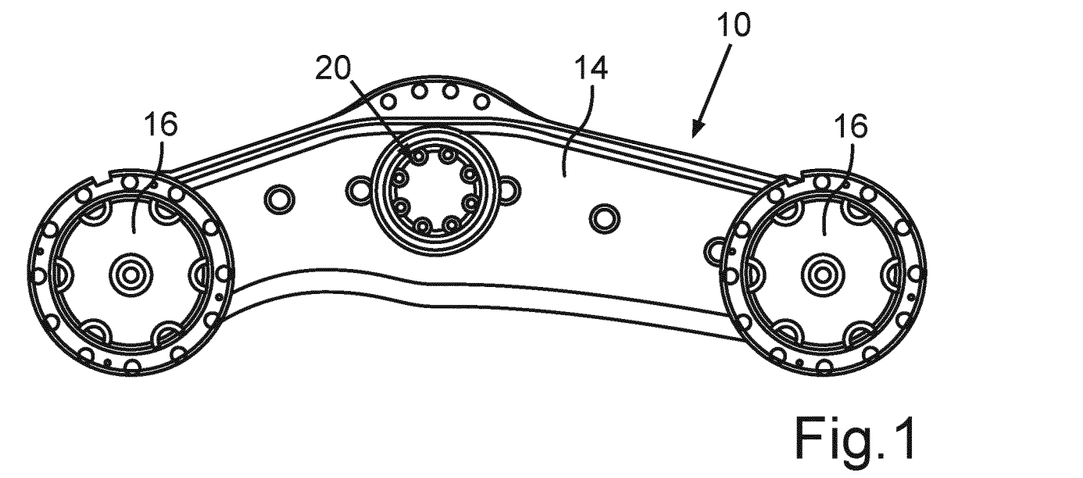
FIG. 1 a side view of a bogie axle according to the invention.
Figure 2:
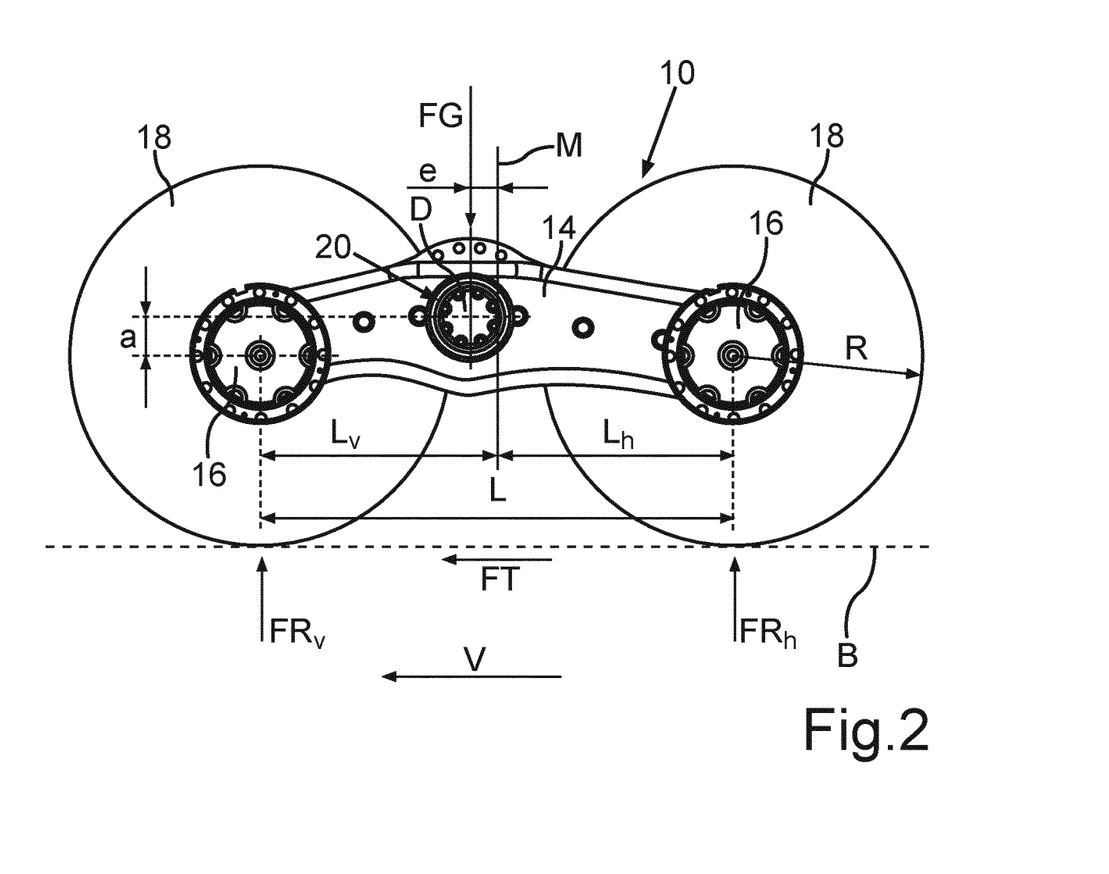
FIG. 2 a schematic side view of the bogie axle according to the invention with dimensions and force vectors.

FIG. 1 shows a side view of a bogie axle 10 according to the invention for a vehicle 12 (FIG. 4) with a preferred travelling direction V. In the following, FIG. 1 is explained in synopsis with FIG. 2, which shows a schematic side view of the bogie axle 10 according to the invention with dimensions and force vectors. The bogie axle 10 according to the invention includes at least one axle rocker 14, which comprises two hubs 16 arranged spaced as an output for arranging a front wheel 18 and a rear wheel 18, and which comprises an axle rocker mounting 20 arranged between the hubs 16 for pivotable mounting of the axle rocker 14 on an axle carrier or vehicle frame (not shown) of the vehicle 12. The axle rocker mounting 20 comprises an input shaft 22 (FIG. 5) as an input, which, for driving the front wheel 18 and the rear wheel 18, is coupled to them via at least one transmission 24 (FIG. 6). As one in particular recognizes in FIG. 2, the geometry of the axle rocker 14 corresponds to formula I:

$$0.05 \leq \frac{e}{R\left(1 - \frac{i_{BB}}{i}\right) + a} = \frac{FT}{FG} \leq 0.4, \quad (I)$$

in which there denote e: eccentricity of a rotational axis D of the axle rocker mounting 20 in preferred travelling direction V starting from a center axis M arranged between the hubs 16;

R: static tire radius of the wheels 18 to be mounted or mounted;

i: transmission gear ratio of the axle rocker 14 as a ratio of an input rotational speed of the input to an output rotational speed of the output;

a: superelevation of the rotational axis D with respect to central points of the hubs 16 of the axle rocker 14;

FT: sum of the tangential wheel loads FT of the bogie axle 10 in the mounted state during the operation of the vehicle 12; and FG: sum of the radial front wheel loads $FR_v$ and of the radial rear wheel loads $FR_h$ of the bogie axle 10 in the mounted state during the operation of the vehicle 12 and in which $i_{BB}$: is 1, if the bogie axle 10 does not comprise a torque divider 44 (FIG. 6) for homogenization of a moment of force ununiformly acting on the front wheel 18 and the rear wheel 18; or in which $i_{BB}$ denotes a gear ratio of the torque divider 44 if the bogie axle 10 comprises the torque divider 44 for homogenization of the moment of force ununiformly acting on the front wheel 18 and the rear wheel 18.

Generally, the mentioned parameters are ascertained considering the wheels 18 to be mounted or already mounted and with the bogie axle 10 mounted on the vehicle 12 on flat contact or ground surface B, respectively. Generally, a typical operating situation of the concerned vehicle 12 is to be understood by "operation of the vehicle 12", that is an operating situation, in which the vehicle 12 is at least predominantly in the usual operation. As one recognizes in FIG. 2, the center axis M is perpendicular to the ground surface B and bisects a wheel base L, which is measured between central points of the hubs 16, into a front partial section $L_v$ and a rear partial section $L_h$.

Thus, the bogie axle 10 according to the invention is eccentrically mounted, wherein the eccentricity e according to formula (I) is adapted to the tire radius R, the superelevation a of the rotational axis D with respect to the central points of the hubs 16 of the axle rocker 14 as well as the gear ratios of the transmissions between input and output of the axle rocker i and $i_{BB}$. Therein, the choice of the limit value between 0.05 and 0.4 is mainly determined by the traction force-axle load ratio FT/FG typical of the application of the concerned vehicle 12, in which a complete or at least largely complete compensation for the rising effect of the bogie axle 10 particularly advantageously appears. The upper limit of 0.4 represents a typical ratio FT/FG in heavy applications such as for example in forestry machines. The lower limit 0.05 can be used for (partial) compensation for a rising effect comparatively low in practice. By this eccentric arrangement of the axle rocker mounting 20 of the axle rocker 14 to the front or in the direction of the preferred travelling direction V, the static axle load is displaced towards the front wheel 18 and the following advantages in particular result:

1.) The front wheel 18 normally less loaded in the operation is first slightly more severely loaded at the stop.

2.) By the rising effect of the bogie axle 10, the front wheel 18 is then unloaded in the operation of the vehicle 12, whereby the front and rear wheel contact forces $FR_v$ and $FR_h$ are homogenized. In the typical operating point of the vehicle 12, the wheel contact forces $FR_v$ and $FR_h$ are ideally completely or at least nearly completely compensated for.

3.) Upon traversing heavy obstacles (high traction force requirement/"full power"), the front wheel 18 is then even further unloaded, whereby the axle load again displaces to the rear wheel 18, such that a certain rising effect again results, which advantageously facilitates traversing the obstacle. However, the maximum load of the rear wheel 18 is lower also in this case than in a conventional bogie axle. Thus, the drive components of the rear wheel 18 can be designed comparatively more lightweight and more inexpensively in the bogie axle 10 according to the invention.

4.) The eccentric mounting of the bogie axle 10 does not require additional installation space and additional drive components and can therefore be cost-neutrally designed in principle.

5.) By the reduced mechanical loads, an improved lifetime of the bogie axle 10 results.

The inventive adaptation of the displacement of the axle rocker mounting 20 to the front (measure "e"), of the bogie superelevation (measure "a") and of the transmission gear ratio i can be ascertained as follows. A balanced wheel load and thereby a uniform ground pressure as well as mostly uniform loading of the drive train parts at the front and rear arise if the radial wheel force components $FR_v$ and $FR_h$ are the same at the front and rear:

$$FR_v = FR_h = \frac{1}{2} FG \quad (1)$$

Hereto, it is convenient to define the wheel loads as follows:

$$FR_v := \frac{1}{2} F_G + \Delta FR_{stat} - \Delta FR_{dyn} \quad (2)$$

$$FR_h := \frac{1}{2} F_G - \Delta FR_{stat} + \Delta FR_{dyn} \quad (3)$$

with:
FG:=weight force on the considered axle rocker
$\Delta FR_{stat}$:=static wheel load increase by eccentricity e (here: displacement to the front)
$\Delta FR_{dyn}$:=dynamic wheel load increase by drive forces (here: forward travel)

The moment equilibrium around the wheel contact point provides:

$$\Delta FR_{stat} = \frac{e}{L} \cdot FG \quad (4)$$

with:
e:=eccentricity of the axle rocker mounting
L:=wheel base of the axle rocker The moment equilibrium around the input shaft 22 of the axle rocker 14 provides:

$$\Delta FR_{dyn} = \frac{FT}{L} \cdot \left[ R\left(1 - \frac{1}{i}\right) + a \right] \quad (5)$$

with:
FT:=tangential wheel load (traction force) of the considered axle rocker
R:=static tire radius
i:=transmission gear ratio of the axle rocker
a:=superelevation of the axle rocker Substitution of (2) and (3) into (1) provides:

$$\Rightarrow \Delta FR_{stat} = \Delta FR_{dyn}$$

thus with (4) and (5):

$$\Rightarrow \frac{e}{L} \cdot FG = \frac{FT}{L} \cdot \left[ R\left(1 - \frac{1}{i}\right) + a \right]$$

By converting, the condition (6) known from formula (I) finally results for the inventive design of the bogie axle 10:

$$\boxed{\frac{e}{R\left(1 - \frac{1}{i}\right) + a} = \frac{FT}{FG}} \quad (6)$$

According to the invention, balanced wheel contact forces at the front and rear thus arise if eccentricity e, tire radius R, gear ratio i and superelevation a of the axle rocker 14 are adapted to the traction force ratio FT/FG of the associated vehicle 12 as illustrated in formula (i). According to requirement of the vehicle 12, it can for example be the maximum traction force ratio or else a medium traction force ratio in typical working situations. In vehicles 12 with variable useful load such as for example harvesting machines, the axle load and thereby FG continuously increases with increasing loading. At the same time, however, the required traction force also increases thereby such that a similar, approximately constant traction force ratio appears over large time ranges with given ground conditions.

Embodiment

As a typical traction force ratio in the working range of a vehicle 12 presently formed as a combine harvester, a ratio FT/FG=0.2 is assumed. The tire radius R of the mounted wheels 18 is R=650 mm in the present example. The gear ratio i is i=8.2. The superelevation a for compensating for the smaller tire radii R compared to tire radii R', which would be used for a conventional rigid axle 28 (FIG. 4), is a=200 mm. Thus, e≈154 mm results from (6).

Figure 4:
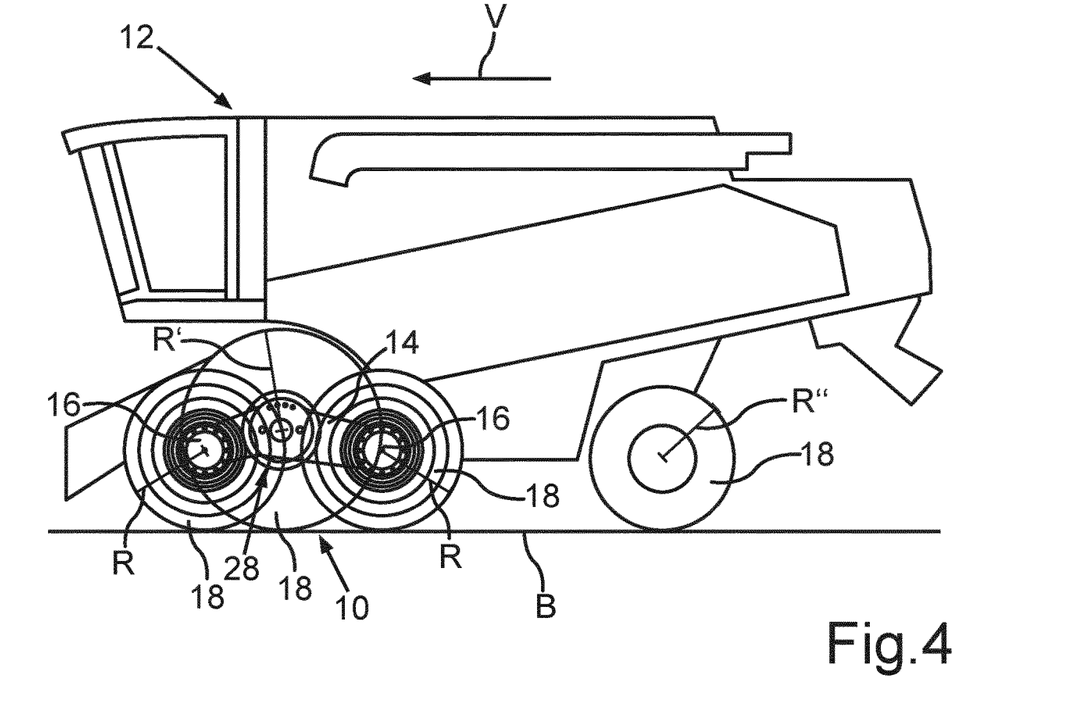
FIG. 4 a schematic diagram of the combine harvester, in which a two-wheeled rigid axle is exchanged for the bogie axle according to the invention.

Hereto, FIG. 4 shows a schematic diagram of the combine harvester 12, in which a two-wheeled rigid axle 28 with individual wheels 18 with radius R' is exchanged for the bogie axle 10 according to the invention, which is dimensioned as described. The bogie axle 10 is arranged on a vehicle frame (not shown) of the vehicle 12 in conventional manner and comprises two axle rockers 14 pivotable in relation to the vehicle frame on both sides of the vehicle 12. From the axle rockers 14, the axle rocker 14 left viewed in preferred travelling direction V is apparent in FIG. 4. In contrast to the rigid axle with a wheel 18 with larger radius R' per vehicle side, the bogie axle 10 comprises each two wheels 18 per vehicle side with respectively smaller radius R. The radii R of the wheels 18 are presently identical, but can basically also be selected different. Furthermore, the radii R of the wheels 18 of the bogie axle 10 can correspond to the radius R" of the conventionally mounted rear wheel 18 of the combine harvester 12, such that the same wheel types and dimensions, respectively, can for example be used for the bogie axle 10 and the rear axle of the vehicle 12. The input of the bogie axle 10 according to the invention is preferably effected coaxially or to the input of the rigid axle 28. As shown in FIG. 4, this allows a simple exchangeability of the rigid axle 28 and bogie axle 10 without position change of the transmission of the vehicle 12. The gear ratio i in the axle rocker 14 and the superelevation a are preferably selected such that the tire radii R of the bogie axle 10 smaller with respect to the standard radii R' of the rigid axle 28 are completely or at least largely compensated for. This allows a simple exchangeability of rigid axle 28 and bogie axle 10 with identical or at least largely identical traction force and/or maximum speed of the vehicle 12.

Figure 3:
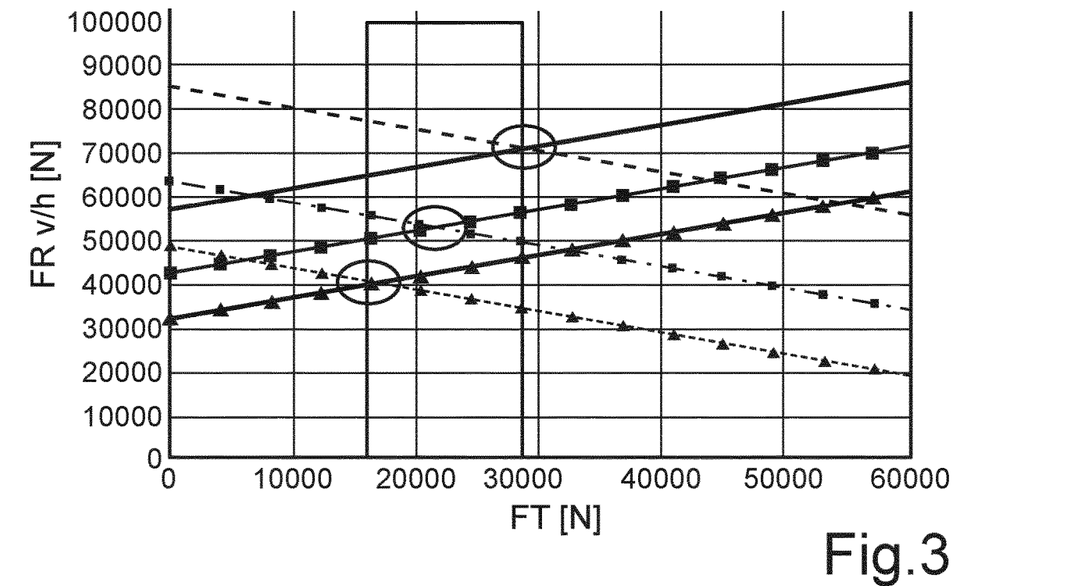
FIG. 3 a diagram of the wheel contact forces of a combine harvester with different loading states and axle loads.

For further explanation, FIG. 3 shows a diagram of the wheel contact forces $FR_{v/h}$ if the combine harvester 12 shown in FIG. 4 with different loading states and axle loads with application of the above mentioned parameters from this embodiment. Therein, the front and rear wheel contact forces $FR_{v/h}$ in N are plotted on the ordinate, while the traction force FT of the axle rocker 14 in N is plotted on the abscissa. In FIG. 3, the typical working range of the combine harvester 12 is marked as a dark area. Furthermore, there denote:

dashed line without symbols: front wheel contact force $FR_v$ with full loading dashed line with squares: front wheel contact force $FR_v$ with half loading dashed line with triangles: front wheel contact force $FR_v$ without loading (empty)

solid line without symbols: rear wheel contact force $FR_h$ with full loading solid line with squares: rear wheel contact force $FR_h$ with half loading solid line with triangles: rear wheel contact force $FR_h$ without loading (empty)

The intersections of the front wheel contact force $FR_v$ and of the rear wheel contact force $FR_h$ in the respective loading state are respectively marked with circles. One recognizes that the ratio FT/FG≈0.2 is always within the marked area independently of the loading state and thereby covers the entire typical working range of the combine harvester 12.

The displacement of the axle load adapted according to the invention to the front wheel thus acts beneficially for the ground pressure and the durability of the drive components in most of the travelling situations. It acts particularly beneficially with configuration according to the invention in typical working situations, such as for example in the corn harvest, where it makes an essential contribution to ground protection and productivity.

Figure 5:
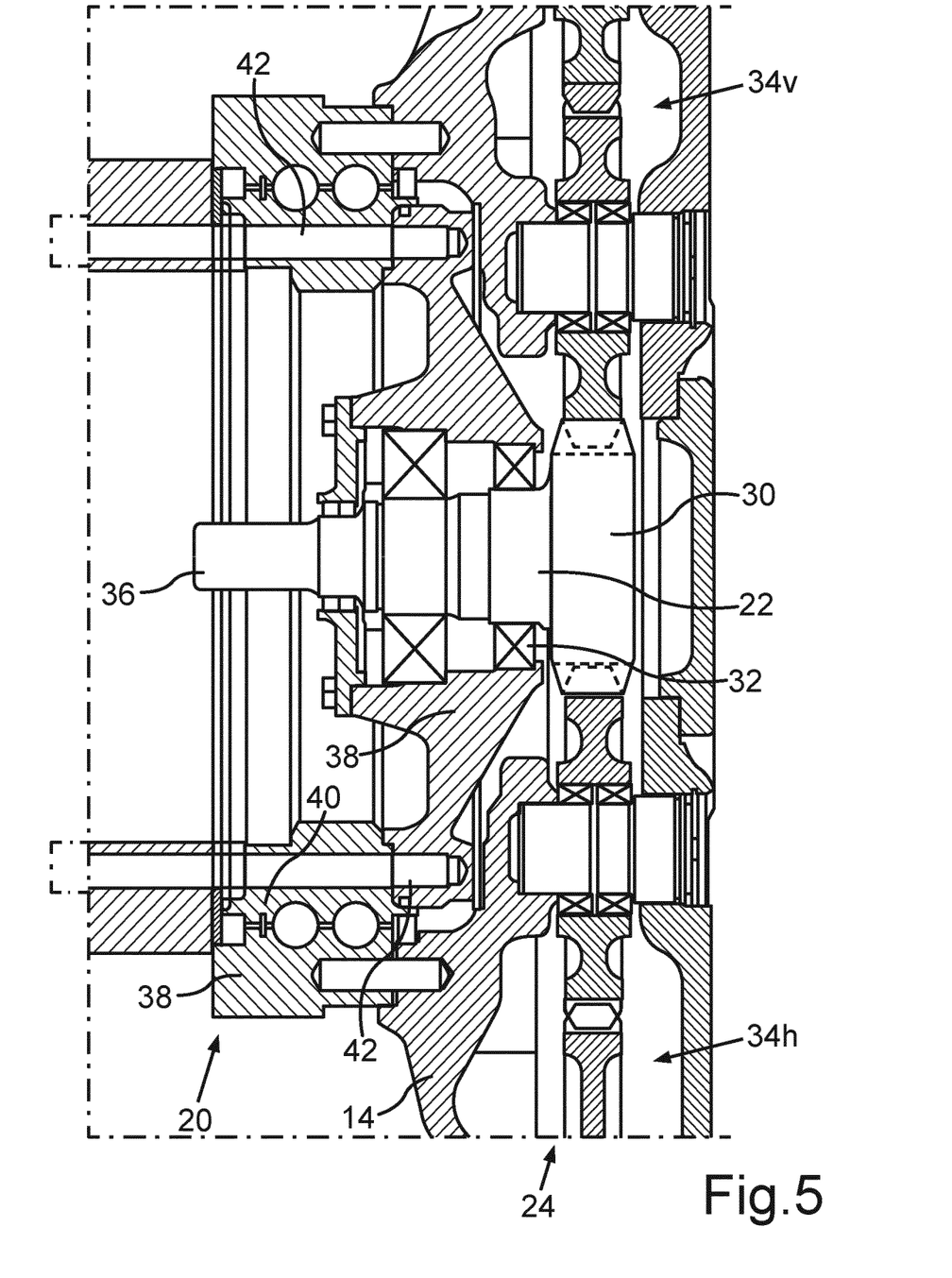
FIG. 5 a schematic cross-section through an axle rocker mounting of the bogie axle according to the invention according to a further embodiment.
Figure 6:
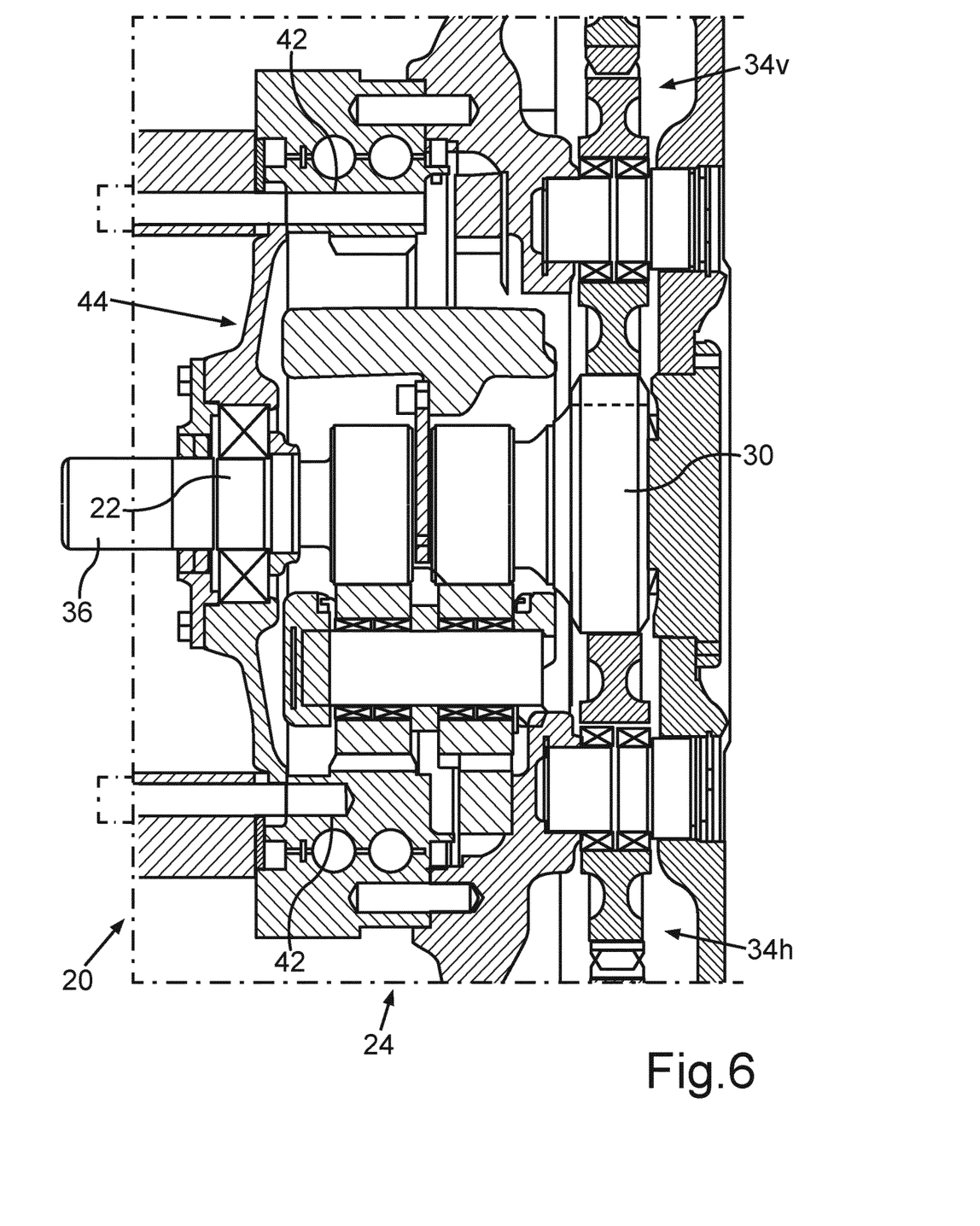
FIG. 6 a schematic cross-section through an axle rocker mounting of a further embodiment of the bogie axle according to the invention with torque divider.

FIG. 5 shows a schematic and partial cross-section through the axle rocker mounting 20 of the bogie axle 10 according to the invention according to a further embodiment. In conventional, non-inventive bogie axles, the axle rocker thereof with slewing ring is usually directly connected to the differential via an axle carrier ("integrated" construction). The input shaft 22 of the bogie axle 10 according to the invention can be mounted in floating manner. The central input wheel 30 in the axle rocker 14 only requires a support bearing 32 for absorbing the difference of the forces, which arises from the tooth engagements with a front and rear gear chain 34v, 34h. Therein, the bearings of the input or input shaft 22 have backlash to the axial stop such that the input shaft 22 can axially shift with backlash.

Further advantageous configurations include providing a stub shaft 36 for connection of an external drive shaft (separate construction) besides the independent mounting of the input shaft 22. A centering of a flange 38 is effected at a part 40 of the swivel bearing standing on the vehicle side or at the vehicle frame. Preferably, the flange 38 is designed such that it provides threads 42 for attaching to the vehicle frame at the same time. The flange 38 and thus the mounting is thereby not mounted on the axle rocker 14 and thus stationarily with respect to the axle rocker 14, but stationarily with respect to the vehicle frame in unusual manner, for example via a standing inner ring of the axle rocker mounting 20 connected to the vehicle frame (for example via a ball slewing ring).

The independent mounting of the input shaft 22 allows a "separate" construction, in which a differential (not shown) can for example be attached to or in the vehicle frame as a separate assembly and can be connected to the also separately attached wheel output or here the separately attached axle rocker 14 by means of an optionally open running shaft (such as for example usual in combine harvesters). A mounting of the input shaft 22 in the tandem axle carrier usual in the prior art would be disadvantageous here because the stub shaft 36 for connecting the drive shaft coming from a differential would then be offset to the connection of the slewing ring at the vehicle frame due to tolerance. Thus, flexible clutches or even a cardan shaft would be required for connection of the drive shaft.

Further advantageous designs provide a centered mounting of the input shaft 22 or of the input wheel 30 in the axle rocker mounting 20 or in a standing ring of the axle rocker mounting 20. Then, the axle rocker mounting 20 can in turn be centered with respect to the vehicle frame to ensure an optimum alignment of the shafts to be connected to each other with each other. Thereby, an advantageous configuration of the flange 38 can serve for this mounting, in that the flange 38 also provides the already mentioned threads 42 for attachment to the vehicle frame. This allows a design of the connection of the axle rocker 14 or of the bogie axle 10 to the vehicle 12 optimized in cost and installation space.

FIG. 6 shows a schematic cross-section through an axle rocker mounting 20 of a further embodiment of the bogie axle 10 according to the invention. Therein, in contrast to the previous embodiment, the axle rocker mounting 20 comprises a so-called "balancing system", that is a torque divider 44 for compensating for the axle load displacement to the front wheel 18 of the bogie axle 10 in braking. Similarly, the balancing system 44 can be advantageously employed if the traction force ratio is particularly high in the operation of the vehicle 12 such that the computationally required eccentricity e of the bogie axle 10 would become too large for the practical application. Upon design of the torque divider 44 by means of a double planetary gearing at the input (input shaft 22), the gear ratio of the axle rocker 14 effective for the dynamic wheel load displacement reduces by the gear ratio of the double planetary gearing and the condition for uniform wheel loads is then calculated as follows:

$$\frac{e}{R\left(1-\frac{i_{BB}}{i}\right)+a} = \frac{FT}{FG}, \quad (7)$$

wherein $i_{BB}$ denotes the gear ratio of the torque divider 44 and FT/FG is between 0.05 and 0.4. Thus, thanks to the torque divider 44, a comparatively lower eccentricity e is required for the same traction force ratio FT/FG to balance the wheel forces $FR_v$ and $FR_h$.

Figure 7:
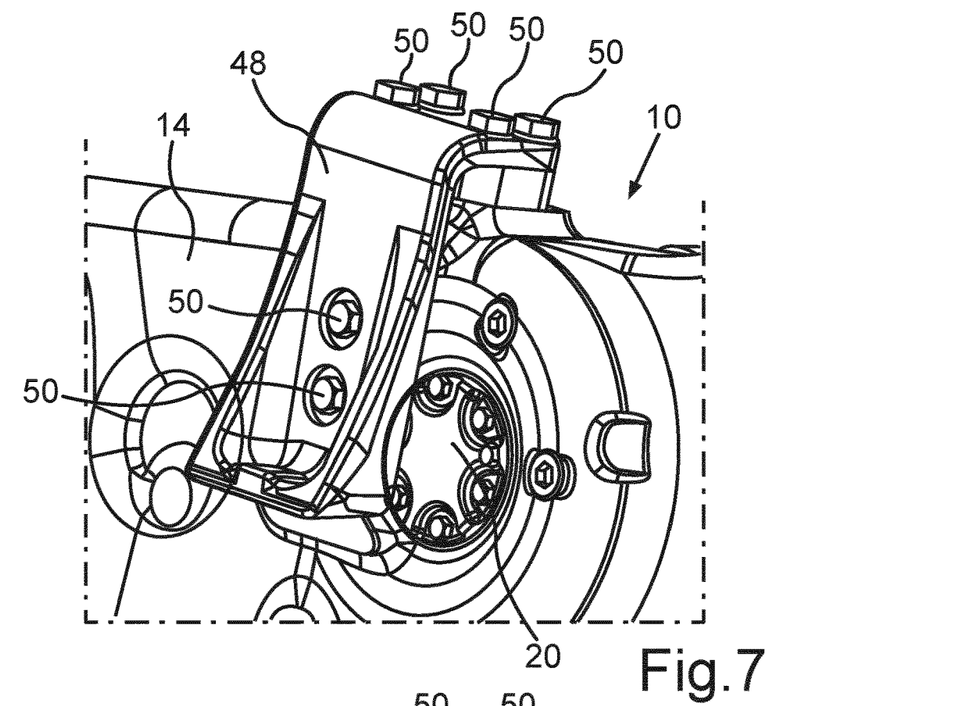
FIG. 7 a schematic and perspective view of a bogie stopper attached to the axle rocker.
Figure 8:
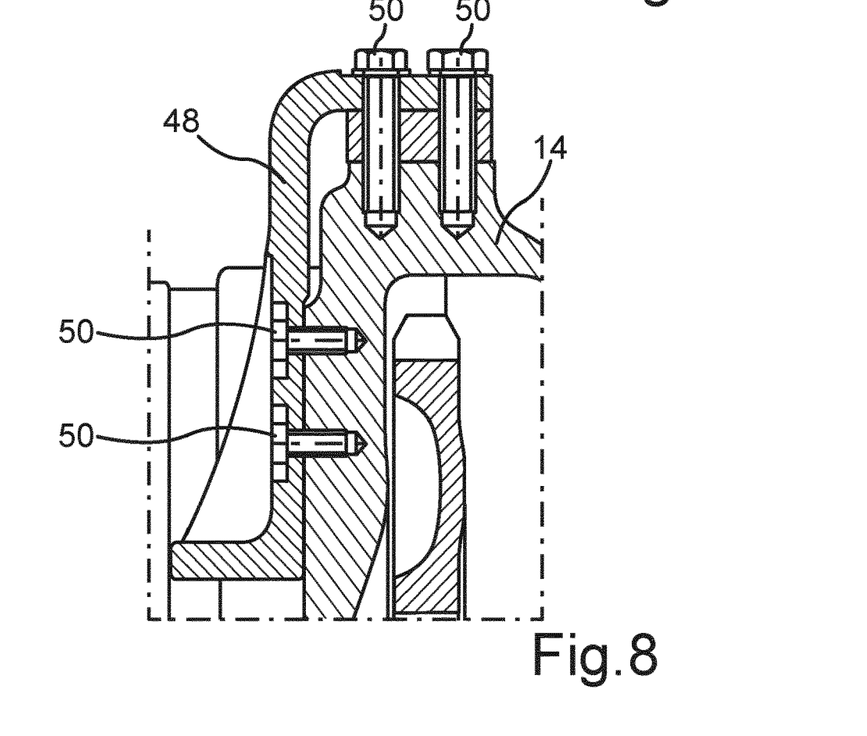
FIG. 8 a schematic and partial longitudinal section of the bogie stopper shown in FIG. 7.

FIG. 7 shows a schematic and perspective view of a basically optional bogie stopper 48 attached to the axle rocker 14, which can stop at an associated stop stationarily attached with respect to the vehicle frame. FIG. 7 is explained in synopsis with FIG. 8, in which a schematic and partial longitudinal section of the bogie stopper 48 shown in FIG. 7 is formed. The bogie stopper 48 limits the relative rotation of the axle rocker 14 with respect to the vehicle frame together with an associated stop on the vehicle frame (not shown). Thereby, a rollover of the axle rocker 14 and a tire collision with the chassis can be prevented. One recognizes that the bogie stopper 48 is detachably screwed to the axle rocker 14 via screws 50 and thereby exchangeably attached to it in the shown example. Thus, it can be simply replaced upon damage. The same can be provided for associated stop points on the vehicle frame. Inversely, the bogie stopper 48 can of course also be non-detachably connected to the axle rocker 14 or be integrally formed.

Figure 9:
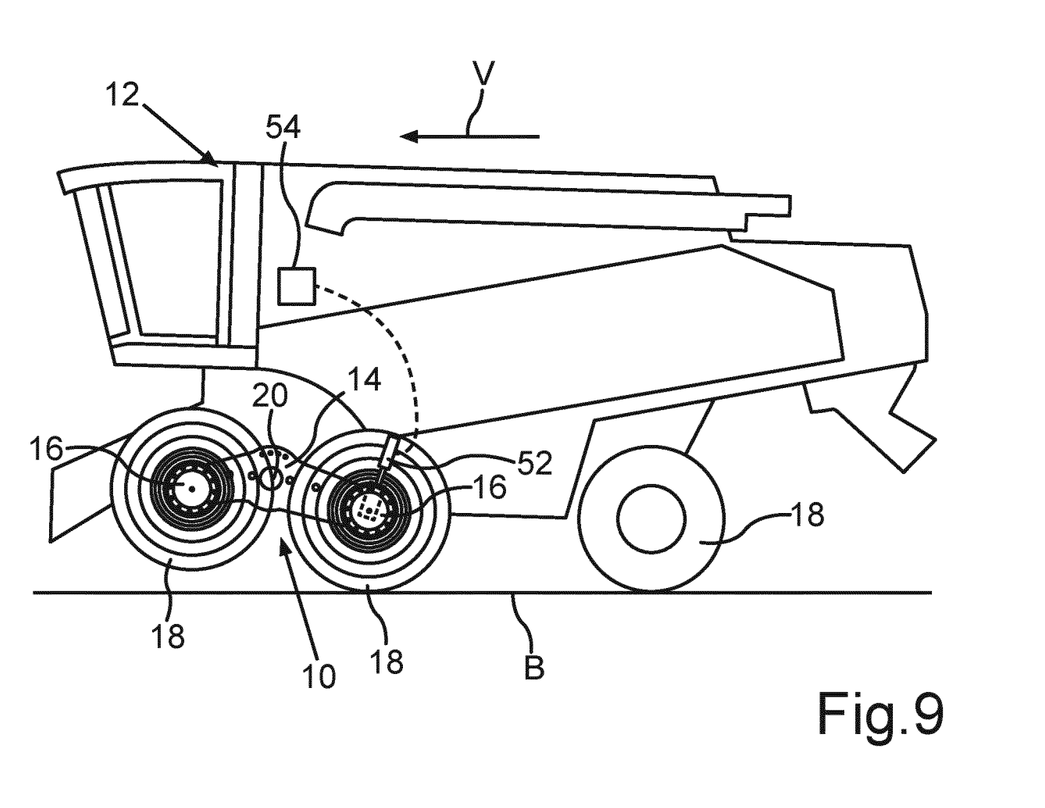
FIG. 9 a schematic diagram of a vehicle, which is equipped with the bogie axle according to the invention and includes an actuator, by means of which an actuating force can be exerted on the axle rocker, to unload the front wheel of the bogie axle and to load the rear wheel.

FIG. 9 shows a schematic diagram of a vehicle 12, which is equipped with the bogie axle 10 according to the invention and additionally comprises an actuator 52 in the present embodiment, by means of which an actuating force can be exerted on the axle rocker 14, to unload the front wheel 18 of the bogie axle 10 and to load the rear wheel 18 depending on situation. Basically, it can also be inversely provided that the actuator 52 loads the front wheel 18 and unloads the rear wheel 18 depending on situation. The actuator 52, which presently includes a hydraulic cylinder, thereby represents a type of "bogie lift" and is attached to the vehicle frame at the one end and to the rear part of the axle rocker 14 at the other end. Of course, the actuator 52 can generally also be attached to the front part of the axle rocker 14. As needed, the actuator 52 presses the rear wheel 18 downwards or pulls it upwards to change the load of front and rear wheel 18. The "bogie lift" 52 can for example be advantageously employed in forward travel to unload the front wheel 18 and thus to support turning maneuvers (for example at the field end). Upon complete unloading of the front wheel 18, the turning circle is therein also reduced, which is for example advantageous in maneuvering on narrow yards. Hereto, the actuator 52 can be activated manually (in turning) or else automatically or depending on situation (for example in braking). For a basically optional automatic actuation, the actuator 52 is coupled to a control device 54 of the vehicle 12 for data exchange in the shown example, which is formed to control and/or to regulate the actuator 52 depending on a travelling situation. Alternatively or additionally, the control device 54 can also be used to control and/or regulate the above mentioned "balancing system" 44 if the bogie axle 10 is equipped with such one.

The parameter values specified in the documents for the definition of process and measurement conditions for the characterization of specific characteristics of the inventive subject matter are to be considered as encompassed by the scope of the invention also within the scope of deviations—for example due to measurement errors, system errors, DIN tolerances and the like.

LIST OF REFERENCE CHARACTERS

10 bogie axle
12 vehicle
14 axle rocker
16 hub
18 wheel
20 axle rocker mounting
22 input shaft
24 transmission
28 rigid axle
30 input wheel
32 support bearing
34v gear chain
34h gear chain
36 stub shaft
38 flange
40 part
42 thread
44 torque divider
44 system
48 bogie stopper
50 screw
52 actuator
54 control device
V preferred travelling direction
B ground surface
L wheel base
R radius
D rotational axis
M center axis

The invention claimed is:

1. A bogie axle for a vehicle with a preferred travelling direction (V), comprising at least one axle rocker, which comprises two hubs arranged spaced as an output for arranging a front wheel and a rear wheel, and which comprises an axle rocker mounting arranged between the hubs for pivotable mounting of the axle rocker on an axle carrier, wherein the axle rocker mounting comprises an input shaft as an input, which, for driving the front wheel and the rear wheel, is coupled to them via at least one transmission,
wherein,
a geometry of the at least one axle rocker corresponds to formula I:

$$0.05 \leq \frac{e}{R\left(1 - \frac{i_{BB}}{i}\right) + a} = \frac{FT}{FG} \leq 0.4, \qquad (I)$$

in which there denote,
e: eccentricity of a rotational axis (D) of the axle rocker mounting in preferred travelling direction (V) starting from a center axis (M) arranged between the hubs;
R: static tire radius of the wheels to be mounted;
i: transmission gear ratio of the axle rocker (14) as a ratio of an input rotational speed of the input to an output rotational speed of the output;
a: superelevation of the rotational axis (D) with respect to the central points of the hubs of the axle rocker;
FT: sum of the tangential wheel loads FT of the bogie axle in the mounted state during the operation of the vehicle; and
FG: sum of radial front wheel loads $FR_v$ and radial rear wheel loads $FR_h$ of the bogie axle in the mounted state during the operation of the vehicle, and in which, $i_{BB}$ is 1 if the bogie axle does not comprise a torque divider for homogenization of a moment of force ununiformly acting on the front wheel and the rear wheel; or in which, $i_{BB}$ denotes a gear ratio of the torque divider if the bogie axle comprises the torque divider for homogenization of the moment of force ununiformly acting on the front wheel and the rear wheel.

2. The bogie axle according to claim 1, wherein, the static tire radius (R) is selected smaller than in an equivalent associated vehicle with a two-wheeled rigid axle instead of the bogie axle.

3. The bogie axle according to claim 2, wherein, the transmission gear ratio i is selected such that the tire radius (R) smaller compared to the rigid axle is at least 90% compensated for and/or that the superelevation (a) of the input shaft with respect to the hubs of the axle rocker is selected such that a height difference, which arises by the tire radii (R) smaller compared to the rigid axle, is at least 90%, compensated for.

4. The bogie axle according to claim 1, wherein, the input shaft comprises a stub shaft for connection of a vehicle-side drive shaft.

5. The bogie axle according to claim 4, wherein a mounting is provided, by means of which the stub shaft is rotatably mounted on the axle rocker.

6. The bogie axle according to claim 5, wherein the mounting is arranged centered in a ring of the axle rocker mounting stationary with respect to a vehicle frame of the vehicle and/or that the mounting includes a flange, which comprises threads for attaching the axle rocker to the vehicle.

7. A vehicle with a preferred travelling direction (V) comprising at least one bogie axle according to claim 1.

8. The vehicle according to claim 7, further comprising at least one bogie stopper, by means of which a relative movement of the axle rocker with respect to the vehicle frame of the vehicle is limited.

9. The vehicle according to claim 8, wherein the bogie stopper and/or the vehicle frame include at least one stop element, which is preferably detachably attached.

10. The vehicle according to claim 7, further comprising at least one actuator, by means of which an actuating force can be exerted on the axle rocker, to load and/or unload the rear wheel and/or the front wheel.

11. The vehicle according to claim 10, wherein the actuator can be manually actuated and/or is coupled to a first control device of the vehicle, wherein the first control device is formed to control and/or regulate the actuator depending on a travelling situation.

12. The vehicle according to claim 7, wherein the bogie axle comprises the torque divider for homogenization a moment of force ununiformly acting on the front wheel and the rear wheel, wherein the torque divider.

13. The vehicle according to claim 12, wherein the torque divider is coupled to a second control device of the vehicle, wherein the second control device is formed to control and/or regulate the torque divider depending on a travelling situation.

14. The vehicle according to claim 13, wherein the second control device controls and/or regulates the torque divider upon violation of a preset traction force ratio limit value, in particular in accelerating and/or braking the vehicle, such that a wheel load displacement to the relatively unloaded front wheel or to the relatively unloaded rear wheel is effected.

15. The vehicle according to claim 7, being formed as at least one of an agricultural machine a combine harvester, a forestry machine, a forwarder, a constructions machine, or a motor grader.

* * * * *